United States Patent

[11] 3,543,810

[72] Inventor Arthur P. Scheller
 Chatham, New Jersey
[21] Appl. No. 736,369
[22] Filed June 12, 1968
[45] Patented Dec. 1, 1970
[73] Assignee Union Carbide Corporation
 a corporation of New York

[54] ROTARY WIRE WELDING STRAIGHTENER
 3 Claims, 6 Drawing Figs.
[52] U.S. Cl. ................................................... 140/147;
 72/78
[51] Int. Cl. ...................................................... B21f 1/02
[50] Field of Search ........................................... 140/147;
 72/77, 78, 79

[56] References Cited
 UNITED STATES PATENTS
 730,549 6/1903 Mallett .......................... 72/78
 FOREIGN PATENTS
 88,051 12/1936 Sweden ........................ 72/78

Primary Examiner—Lowell A. Larson
Attorneys—Paul A. Rose, Thomas I. O'Brien and Dominic J. Terminello ABSTRACT: A wire straightening device incorporating the combination of orbital rotation with longitudinal rotation of a wire guide roll about and along the wire to produce unusually straight wire with minimum amount of pull force.

INVENTOR
ARTHUR P. SCHELLER

INVENTOR
ARTHUR P. SCHELLER
ATTORNEY

ROTARY WIRE WELDING STRAIGHTENER

This invention relates to apparatus for straightening welding wire fed from a source of such wire to a welding gun. More particularly, the invention relates to a rotary wire straightener.

Whenever wire is used in arc welding processes, whether it be used as an electrode or as "cold" filler metal, the problem of straightening the wire is present. Wire is provided either on spools or in cylindrical drums giving the wire a definite cast which is not removed in passing through the drive rolls and guide tubes of the welding equipment. Wire which is not straightened adversely affects the dimensions and properties of the weld deposit.

Many types of wire straighteners have been devised. However, up until now, there has not been available a wire straightener which can produce essentially straight wire while requiring minimum pull force to pull the wire from its source and through the straightener.

Accordingly, it is the object of this invention to provide a welding wire straightener which produces essentially straight welding wire while requiring minimum pull force.

This and other objects of the invention will become apparent from a review of the following description and drawings wherein.

Figure 1:
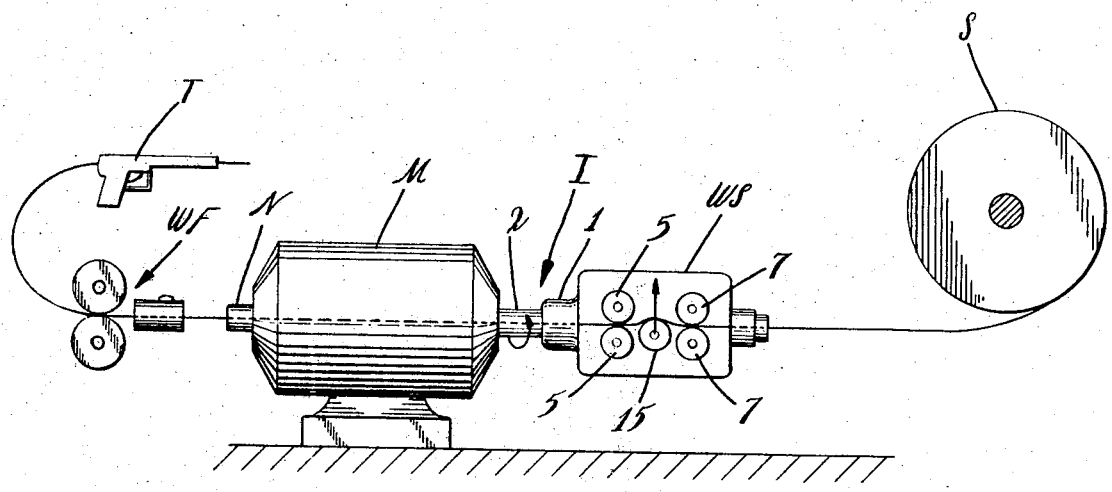
FIG. 1 is a schematic representation of a welding system including the wire straightener of the invention.

Referring now to FIG. 1, wire from a source S thereof which may be a reel or pack is passed through the wire straightener unit I which includes a motor M and straightener WS. A conventional wire feeder WF pulls the wire from source S through the wire straightener unit I and pushes such wire to the torch T. The motor M has a hollow armature shaft 2 to allow wire straightened by straightener WS to pass through it to the torch. The motor M preferably operates on 115 volts at 50 or 60 cycles and rotates at 1725 r.p.m. However, rotational speeds of from 1000 to 3500 may be used. The shaft of motor M is coupled to straightener WS by inserting said shaft into the hub 1 of straightener WS. Set screws 3 (see FIGS. 2 and 3) are tightened to secure the hub 1 to the shaft. Mounted on housing H adjacent hub 1 is a first pair of longitudinally rotatable guide rolls 5. A second pair of longitudinally rotatable guide rolls 7 are mounted in said housing adjacent an inlet guide passage 9 at the other end of the housing H. Each of the guide rolls is provided with two grooves for accommodating two different size ranges of wire. For example, one groove might be 1/32-inch radius to accommodate wires up to 1/16-inch diameter and the other groove might be 3/64-inch radius to accommodate 1/16 to 3/32-inch diameter sizes of wire. Each pair of rolls is fastened to the housing H by a retaining screw 11. These retaining screws 11 permit rotation of the rolls while securing them in place. Fastened between the rolls and the retaining screws 11 are balance weights 13 which maintains the unit WS in balance as it rotates with the motor shaft.

The guide rolls 5 and 7 are in axial alinement with each other and the passage in the hub 1 and the wire guide 9. Slidably mounted on housing H between guide rolls 5 and 7 is an adjustable guide roll 15. Guide roll 15 is mounted on a yoke 17 more clearly seen in FIG. 4. Yoke 17 is secured to housing H by screw 19. When screw 19 is tightened, yoke 17 cannot slide. When screw 19 is loosened, yoke 17 may be adjusted by turning set screw 21 causing yoke 17 and thus guide roll 15 to slide along the housing H. This movement determines the offset of roll 15 with respect to the axial alinement of rolls 5 and 7. The amount of offset necessary is determined by the size of the wire and the degree of straightness desired.

The principle involved in straightening is the application of rapidly alternating bending forces applied to the wire as it passes through the revolving unit WS and over the adjustable offset rotating feed roll 15. These forces must be sufficient to straighten without imposing excessive work hardening and embrittlement of the wire.

The unique advantage of the present invention is that it combines revolving motion of the unit WS with rotating guide rolls 5, 7 and 15. This combination of rotating movements results in a wire straightening unit I which requires remarkably less force to pull the wire from the source to the torch. In similar devices, which do not utilize rotating feed rolls, the force required to pull the wire through the unit is as much as five times greater. Obviously, then the unit of the invention can be used with wire feeders which are much smaller in size and more convenient to handle and less expensive.

Figure 4:
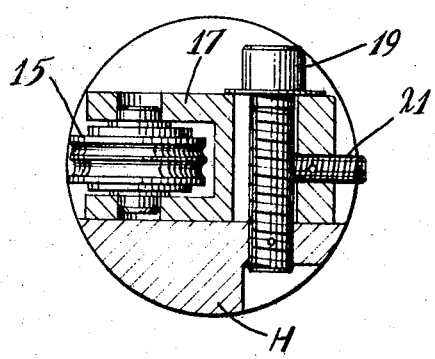
FIG. 4 is a view partially in cross section taken along the line 4-4 in FIG. 3.
Figure 2:
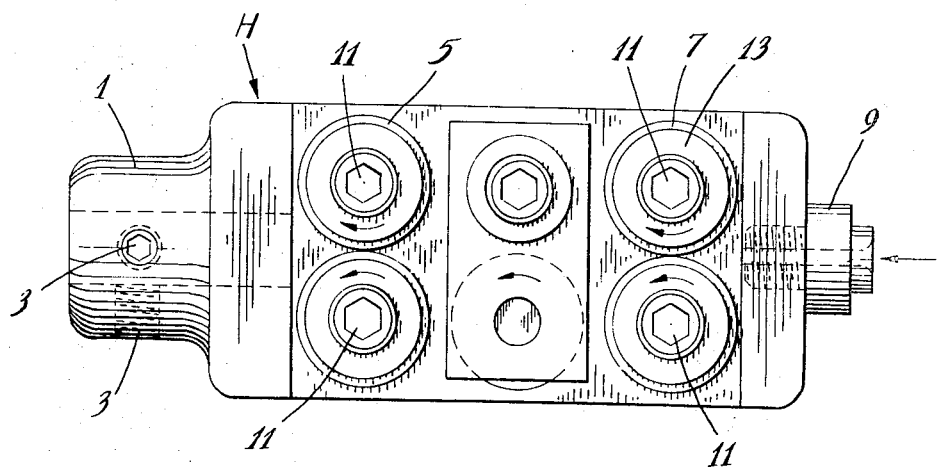
FIG. 2 is a side elevation view of the straightener of the invention.
Figure 3:
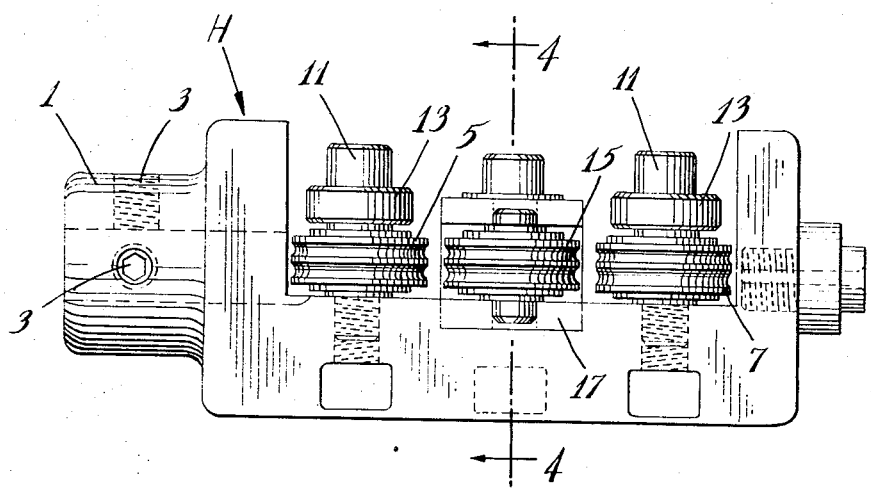
FIG. 3 is a top view of the straightener.
Figure 5:
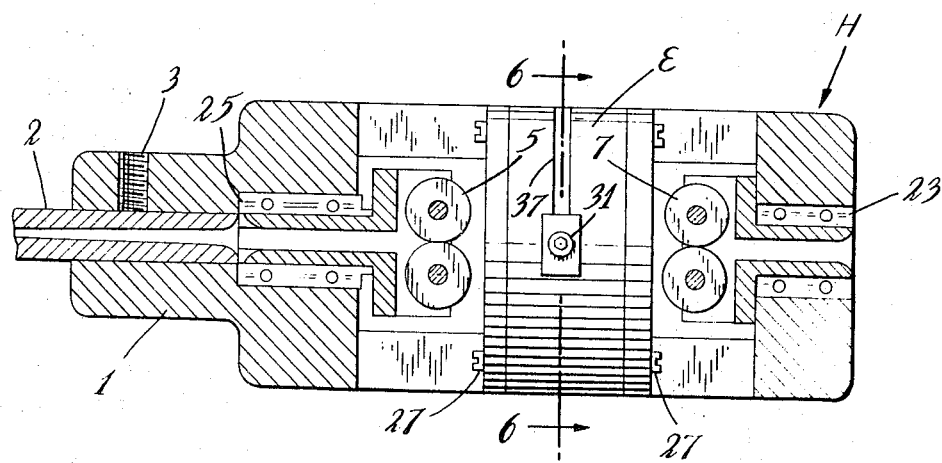
FIG. 5 is a side elevation view of a modification of the invention.
Figure 6:
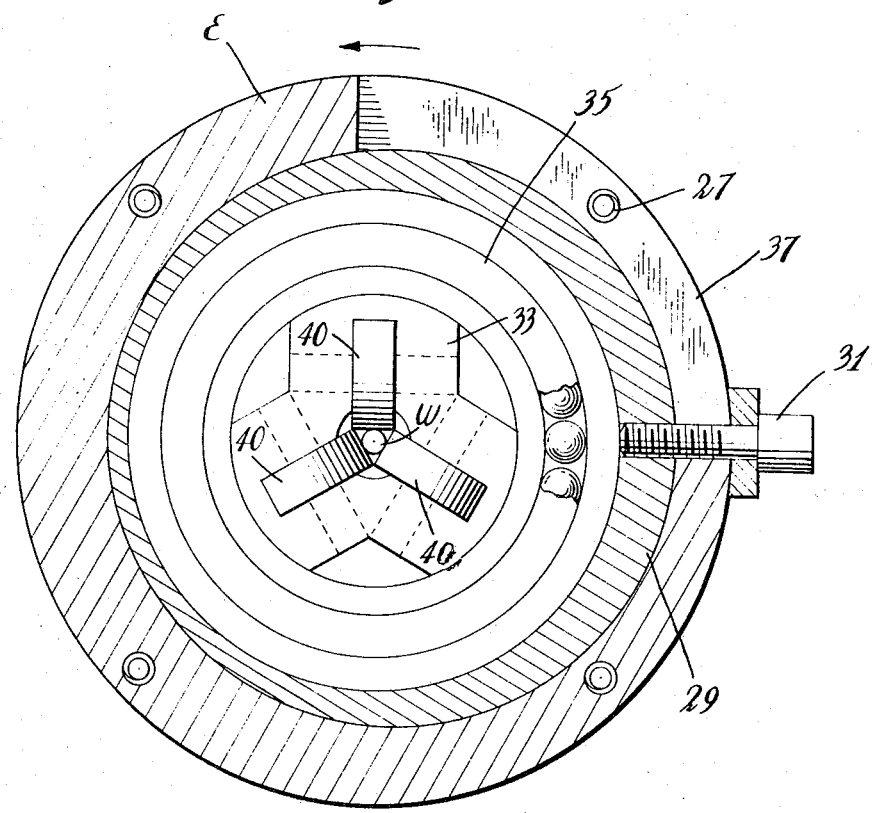
FIG. 6 is a cross-sectional view taken along the line 6-6 in 5.

FIGS. 5 and 6 illustrate a modified form of the apparatus shown in FIGS. 2—4. This modification was developed when it was discovered that by virtue of the guide rolls 5 and 7 rotating about the axis of the wire as it is fed through the straightener assembly there is a tendency for the wire to be twisted about the axis particularly for smaller diameter wires where the straightener assembly is some distance from the wire feed drive. The device shown in FIG. 5 minimizes this problem. In FIG. 5 parts which are common to the parts of the device shown in FIGS. 2 and 3 bear the same reference numerals. In this embodiment the inlet and outlet guide rolls 7 and 5 respectively are mounted in bearing assemblies 23 and 25 respectively within the housing H. A section E is secured to housing H by screws 27. Section E has an eccentric bore. Mounted in the bore is a similarly eccentric member 29 which can be rotated in the bore of section E by adjustment screw 31 to achieve the desired degree of offset as will be described hereinafter. An adjustable offset roller assembly 33 mounted in bearing assembly 35 fits inside the eccentric bore in member 29. By rotating screw 31 in slot 37 the amount of offset of assembly 33 with respect to the axis of the guide rolls 5 and 7 is adjusted. Because the section E is fixed to housing H which is rotated by motor shaft 2, the necessary combination orbital rotation of the roller assembly 33 about the wire W and the longitudinal rotation of the rolls 40 along the wire is achieved. However, the wire W will cause the guide rolls 5 and 7 mounted in bearing assemblies 25 and 23 not to have orbital rotation about the wire but only longitudinal rotation along the wire. The tendency to twist the wire is further reduced by virtue of assembly 33 being able to orbit but not rotate relative to rotating eccentric 29 affixed in section E.

Having described the invention with reference to certain preferred embodiments, it should be understood that modification can be made without departing from the spirit and scope of the invention.

I claim:

1. A rotary wire straightener comprising:
   a housing having a hub at one end provided with a passage for receiving a hollow motor shaft to rotate said housing about its axis, and an inlet passage at the other end;
   a first pair of longitudinally rotatable guide rolls mounted inside said housing adjacent said hub; and a second pair of longitudinally rotatable guide rolls mounted inside said housing adjacent said inlet passage; said first and second pair of rotatable guide rolls being in axial alinement with each other and said inlet passage and said passage for receiving a hollow motor shaft;
   an adjustable guide roll mounted on said housing for rotation therewith between said first and second pair of rotatable guide rolls and offset from the axial alinement of said first and second pairs of longitudinally rotatable guide rolls; and means for adjusting the amount of axial offset of said adjustable guide roll with respect to said first and second pair of guide rolls; said first and second pair of longitudinally rotatable guide rolls and said adjustable guide roll having two grooves for accommodating two different size ranges of wires.

2. A straightener according to claim 1 wherein said adjustable guide rolls is slidably mounted on said housing.

3. A rotary wire straightener comprising:
a housing having a hub at one end provided with a passage for receiving a hollow motor shaft to rotate said housing about its axis, and an inlet passage at the other end;
bearing means mounted in said passage for receiving a hollow motor shaft and said inlet passage;
a first pair of longitudinally rotatable guide rolls mounted in said bearing means and inside said house adjacent said hub, and a second pair of longitudinally rotatable guide rolls mounted in said bearing means and inside said housing adjacent said inlet passage; said first and second pair of rotatable guide rolls being in axial alinement with each other and said inlet passage and said passage for receiving a hollow motor shaft;
an adjustable guide roll mounted on said housing for rotation therewith between said first and second pair of rotatable guide rolls and offset from the axial alinement of said first and second pairs of longitudinally rotatable guide rolls; and means for adjusting the amount of axial offset of said adjustable guide roll with respect to said first and second pair of guide rolls.